July 25, 1939. W. ROCKE 2,167,373
CLUTCH MECHANISM
Filed April 5, 1937
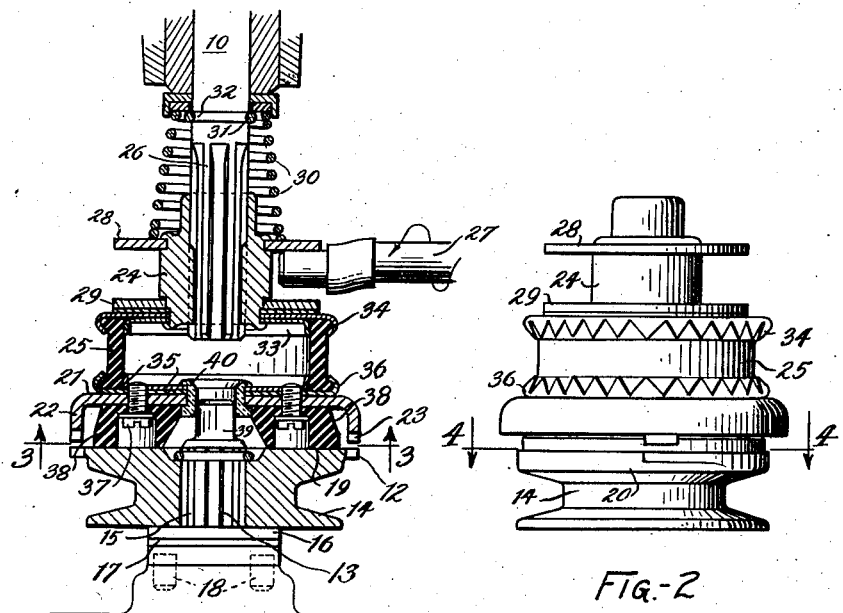
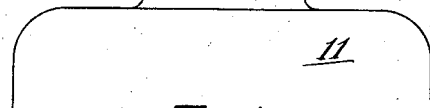
Fig.-1
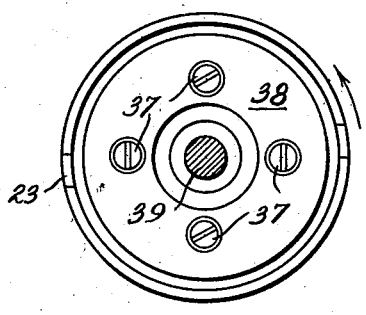
Fig.-3
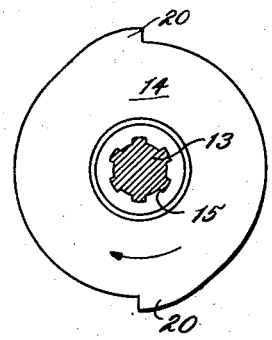
Fig.-4
INVENTOR.
William Rocke
BY Jeffy & Jeffy
ATTORNEYS.

Patented July 25, 1939

2,167,373

UNITED STATES PATENT OFFICE 2,167,373

CLUTCH MECHANISM

William Rocke, South Bend, Ind.

Application April 5, 1937, Serial No. 135,000

6 Claims. (Cl. 192—53)

This invention is directed to a clutch mechanism for power operated washing machines.

An object of this invention resides in the provision of a flexible frictional driving connection for a jaw type clutch which is effective to eliminate sudden jar and clash of parts while positive driving connection through the clutch is being established.

It is a further object of this invention to provide a clutch assembly for devices of this character with sufficient resiliency to accommodate slight misalignment in the cooperating parts of the driving mechanism.

Other objects will be disclosed from the following drawing and descriptions of which:

Fig. 1 is a sectional view illustrating the details of assembly of the present clutch mechanism as applied to the impeller shaft of a washing machine.

Fig. 2 is a side elevational view of the mechanism shown in Fig. 1.

Fig. 3 is an inverted plan sectional view of the leading face of the clutch driven member taken on the line 3—3 of Fig. 1.

Fig. 4 is a plan sectional view taken on the line 4—4 of Fig. 2.

Referring to the drawing, 10 designates the impeller shaft of a washing machine (not shown) which is adapted to be driven by a motor 11 and motor drive shaft through a jaw type clutch indicated generally as at 12.

The driver member of the clutch 12 comprises a pulley 14 splined or keyed to the shaft 13 as at 15. Thrust reaction of the clutch 12 against the motor is taken by a resilient member 16 interposed between the adjacent face of the pulley 14 and a metallic washer 17 secured against rotation by dowel pins 18, as shown in Fig. 1. The upper or leading face of the pulley 14 is relatively flat and smooth to form a seating surface 19 through which driving connection with the driven member of the clutch 12 may be obtained independently of a positive driving connection through the lugs 20 projecting from the peripheral edge of the pulley 14.

The driven member of the clutch 12 comprises a metal drum 21 having a downwardly projecting annular wall 22 provided with lugs 23 adapted to cooperate with the lugs 20 of the pulley 14 for effecting positive driving connection. Attachment of the drum 21 to the impeller shaft 10 is secured through a metal sleeve 24 and a resilient sleeve 25. As shown in Fig. 1, sleeve 24 is provided with splines coacting with key ways 26 formed in the shaft 10 whereby sleeve 24 is adapted to slide vertically with reference to the shaft 10. The position of sleeve 24 with reference to the shaft 10 is controlled by a crank 27 engaged in the annular channel defined by the opposed surfaces of vertically spaced washers 28 and 29 fixed to and projecting radially from the hub portion of the sleeve 24. The upper surface of washer 28 provides a seat for a cone-shaped helical spring 30 anchored at its upper end against a retaining ring 31 seated in a groove 32 in the shaft 10. Thus as the crank 27 is turned in the direction of the arrow shown in Fig. 1 the sleeve 24 is moved up or down under or against the pressure of the spring 30.

In order to mount the drum 21 with respect to the sleeve 24 so as to maintain axial alignment with the clutch driver, the resilient sleeve 25 is employed. Stiffening washers 33 and 34 secured to the lower end portion of the sleeve 24, and companion washers 35 and 36 secured by rivets or screws 37 to the drum 21, define lips between which the cooperating edges of the resilient sleeve 25 are rigidly clamped by crimping or the like.

Positive driving connection between the lugs 20 on the pulley 14 and the lugs 23 of the drum 21, upon movement of the crank 27, is intercepted by an outwardly tapering frusto-conical member 38 secured by the screws 37 to the inner face of the drum 21. It will be noted from Fig. 1 that the leading edge of the member 38 projects forwardly beyond the limits of the lugs 23 whereby upon movement of the crank 27 to move the drum in the direction of the pulley 14, the member 38 will contact the seating surface 19 of the pulley 14. Manifestly, further operation of the crank 27 to engage the lugs 20 of the pulley 14 and the lugs 23 of the drum 21 will cause the member 38 to be pressed firmly against the seating surface 19 with sufficient force to start rotation of the drum 21 and associated parts and gradually increase the speed of the shaft to approximately the same speed as that of the pulley 14. The member 38 is, of course, so designed as to not interfere with complete engagement of the respective lugs 20 and 23 of the pulley and drum aforesaid.

A pilot portion 39 associated with the shaft of the motor 11 is adapted to cooperate with a centering bushing 40 applied in any suitable manner to a central opening through the drum 21, whereby automatic centering and axial alignment of the shafts 13 and 10 is accomplished. Obviously, the flexibility of the sleeve 25 lends itself to this feature.

From the foregoing, it will be apparent that clash and shock to the motor and cooperating shafts of the impeller driving mechanism is eliminated and a clutch assembly having a maximum degree of flexibility without loss of positive driving connection is provided.

Having thus described my invention, what I now claim as new is:

1. In a washing machine, the combination with an impeller shaft, a driving motor having a drive shaft, said shafts being separated from each other, means for establishing positive driving connection between said impeller shaft and said drive shaft comprising a spring pressed jaw clutch driven member and a jaw clutch driver, a flat seating surface on the leading face of said clutch driver, and means associated with the leading face of said driven member comprising a flexible outwardly tapering frusto-conical body having a leading surface extending in advance of the forwardmost portion of said driven member.

2. In a mechanism for driving a washing machine impeller, the combination with an impeller shaft, means for positively driving said shaft including a jaw clutch driver and a jaw clutch driven member, a sleeve slidably mounted on said impeller shaft for rotation therewith, a resilient sleeve secured to said first sleeve and supporting said clutch driven member, and a compressible annular member normally projecting beyond the leading portion of the clutch driven member and attached thereto, means for normally maintaining said clutch driver and driven member in positive driving engagement, and a means for controlling said last named means for disengaging said clutch driver and driven member.

3. A drive connection between a power actuated drive shaft and a shaft to be driven comprising a tooth clutch member mounted upon and for rotation by the drive shaft, said shaft being separated from each other, a companion tooth clutch member operatively associated with the second shaft, manually operable means for controlling the engagement and disengagement of said clutch members with each other, and a resilient compressible and distortable friction clutch member interposed between said first mentioned clutch members and carried by one thereof adapted to frictionally engage the other thereof during the movement of said clutch members into interengaging relation.

4. A drive connection between a power actuated drive shaft and a shaft to be driven comprising a tooth clutch member mounted upon and for rotation by the drive shaft, said shafts being separated from each other, a companion tooth clutch member operatively associated with the second shaft, manually operable means for controlling the engagement and disengagement of said clutch members with each other, one of said clutch members being equipped with a friction clutch surface opposed to the other thereof, and a resilient compressible and distortable friction clutch member secured to the last mentioned clutch member and equipped with a friction surface opposed to and adapted to engage said surface of the other clutch member prior to interengagement of said first-named clutch members during movement of the latter into interengaging relation, said friction clutch member acting to resist yieldingly the last-named movement of said tooth-clutch members.

5. A drive connection between a power actuated drive shaft and a shaft to be driven comprising a tooth clutch member mounted upon and for rotation by the drive shaft, said shafts being separated from each other, a companion tooth clutch member operatively associated with the second shaft, a spring engaged with one of said members for maintaining the same normally engaged with the other thereof, a manually operable device for effecting and maintaining disengagement of said clutch members from each other, one of said clutch members being equipped with a friction clutch surface opposed to the other thereof, and a resilient compressible and distortable friction clutch member secured to the last mentioned clutch member and equipped with a friction surface opposed to and adapted to engage said surface of the other clutch member prior to interengagement of said first-named clutch members during movement of the latter into interengaging relation, said friction clutch member acting to resist yieldingly the last-named movement of said tooth clutch members.

6. A drive connection between a power actuated drive shaft and a shaft to be driven comprising a tooth clutch member mounted upon and for rotation by the drive shaft, said shafts being separated from each other, a companion tooth clutch member operatively associated with the second shaft, a spring engaged with one of said members for maintaining the same normally engaged with the other thereof, a manually operable device for effecting and maintaining disengagement of said clutch members from each other, one of said clutch members being equipped with a friction clutch surface opposed to the other thereof, and a resilient rubber member secured to the other of said clutch member and equipped with a friction surface normally opposed to and spaced from said surface and adapted to engage the latter in advance of interengagement of said tooth clutch members and be compressed as the latter approach and reach interengaging position responsively to the action of said spring.

WILLIAM ROCKE.